United States Patent
Zoon et al.

(10) Patent No.: US 11,641,119 B2
(45) Date of Patent: May 2, 2023

(54) DETECTING A BAD CONTACT OF A CHARGING CABLE

(71) Applicant: ABB Schweiz AG, Baden (CH)

(72) Inventors: Wiebe Zoon, Delft (NL); Matteo Bortolato, Zürich (CH)

(73) Assignee: ABB E-MOBILITY B.V., Delft (NL)

( * ) Notice: Subject to any disclaimer, the term of this patent is extended or adjusted under 35 U.S.C. 154(b) by 1051 days.

(21) Appl. No.: 16/385,479

(22) Filed: Apr. 16, 2019

(65) Prior Publication Data

US 2019/0326762 A1 Oct. 24, 2019

(30) Foreign Application Priority Data

Apr. 18, 2018 (EP) ..................... 18168089

(51) Int. Cl.
*H02J 7/00* (2006.01)
*B60L 53/60* (2019.01)
*B60L 53/302* (2019.01)
*B60L 53/16* (2019.01)

(52) U.S. Cl.
CPC ............ *H02J 7/0036* (2013.01); *B60L 53/16* (2019.02); *B60L 53/302* (2019.02); *B60L 53/60* (2019.02); *B60L 2240/36* (2013.01)

(58) Field of Classification Search
CPC ...... H02J 7/0036; B60L 53/60; B60L 53/302; B60L 53/16; B60L 2240/36
USPC ........................................................ 320/109
See application file for complete search history.

(56) References Cited

U.S. PATENT DOCUMENTS

| 5,670,860 | A | 9/1997 | Conrady et al. | |
|---|---|---|---|---|
| 10,081,262 | B2 | 9/2018 | Nagel et al. | |
| 2009/0195237 | A1* | 8/2009 | Feliss | H02H 5/04 |
| | | | | 323/318 |
| 2013/0267115 | A1 | 10/2013 | Mark | |
| 2015/0217654 | A1 | 8/2015 | Woo et al. | |
| 2016/0221458 | A1* | 8/2016 | Lopez | B60L 53/16 |
| 2017/0338006 | A1 | 11/2017 | Gontarz et al. | |
| 2020/0080901 | A1* | 3/2020 | Myer | H01R 13/6683 |
| 2020/0083701 | A1* | 3/2020 | Myer | G01K 5/52 |

FOREIGN PATENT DOCUMENTS

| CN | 105651806 | B | * | 4/2019 | ............ B60K 6/445 |
|---|---|---|---|---|---|
| CN | 111952106 | A | * | 11/2020 | |
| CN | 113370814 | A | * | 9/2021 | |
| DE | 102016101115 | A1 | * | 8/2016 | ............ B60L 53/14 |
| DE | 102016101115 | A1 | | 8/2016 | |
| DE | 102015112347 | A1 | | 2/2017 | |

(Continued)

*Primary Examiner* — Suresh Memula
(74) *Attorney, Agent, or Firm* — Greenberg Traurig, LLP

(57) ABSTRACT

A method for detecting a bad contact of a charging cable comprises: measuring a cooling fluid temperature of a cooling fluid flowing through the charging cable; measuring a connector base temperature of a connector base of the charging cable, which connector base carries an electrical contact element of the charging cable; estimating a contact temperature of the electrical contact element by determining the contact temperature from a difference of the connector base temperature and the cooling fluid temperature; and deciding presence of a bad contact, when the estimated contact temperature is higher than a threshold temperature.

20 Claims, 3 Drawing Sheets

(56) References Cited

FOREIGN PATENT DOCUMENTS

| | | | | |
|---|---|---|---|---|
| DE | 102019112839 B3 | * | 10/2020 | |
| DE | 102020101258 A1 | * | 7/2021 | |
| EP | 3556597 A1 | * | 10/2019 | ............. B60L 53/14 |
| EP | 3846294 A1 | * | 7/2021 | |
| WO | 2017143295 A1 | | 8/2017 | |
| WO | WO-2017143295 A1 | * | 8/2017 | ............. B60L 53/16 |
| WO | WO-2017178321 A1 | * | 10/2017 | ............. B60L 53/16 |
| WO | WO-2021013369 A1 | * | 1/2021 | ............. B60L 53/18 |

* cited by examiner

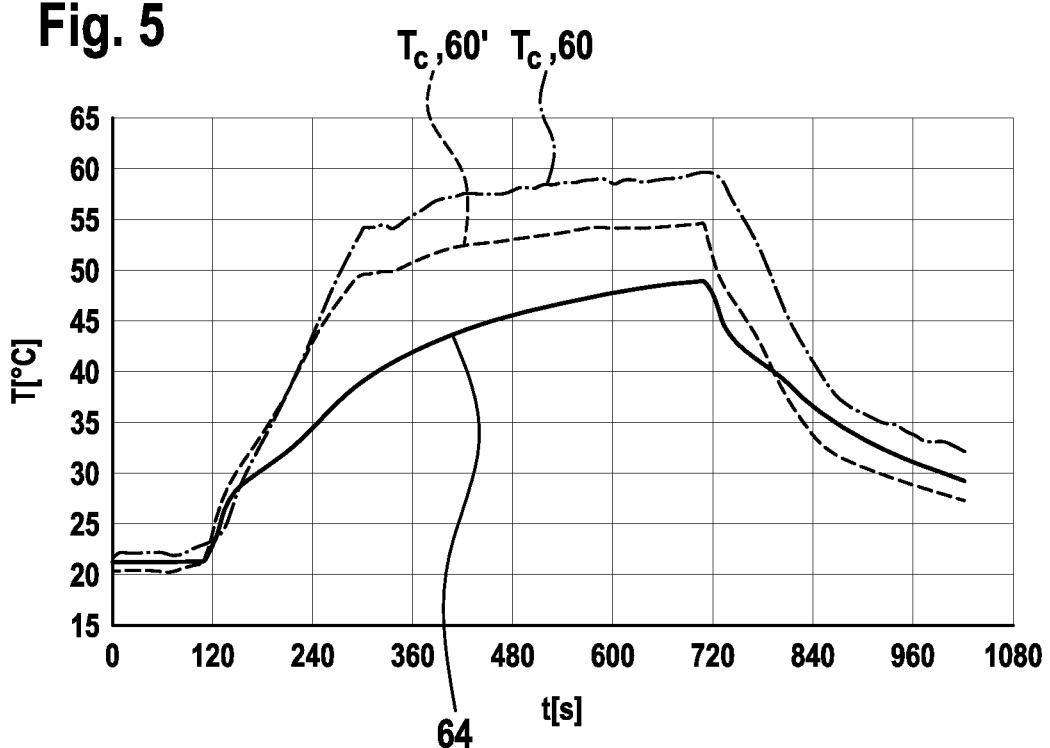
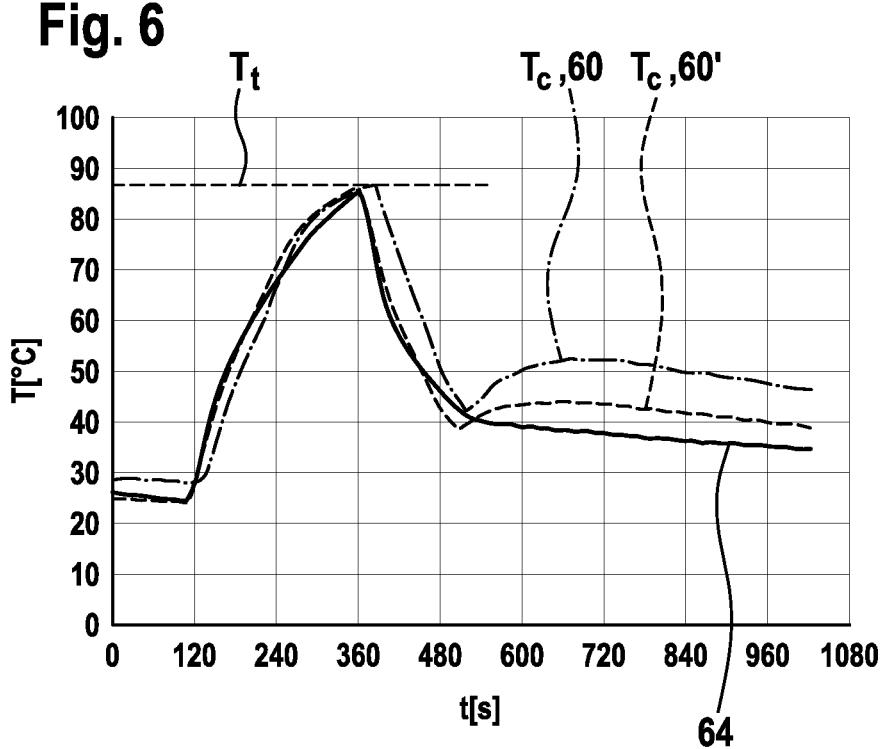

DETECTING A BAD CONTACT OF A CHARGING CABLE

FIELD OF THE INVENTION

The invention relates to the field of electrical charging stations, for example for electric vehicles. In particular, the invention relates to a method and a controller for detecting a bad contact of a charging cable. Furthermore, the invention relates to a charging station.

BACKGROUND OF THE INVENTION

It is expected that electric vehicles will more and more replace vehicles with combustion engine. Thus, an efficient infrastructure for charging electric vehicles need to be provided. An element of such an infrastructure may be a charging station comprising a converter for generating a charging current and with a charging cable for providing the charging current to the electric vehicle. The charging cable may carry a plug to be connected to the electric vehicle.

For fast charging it may be beneficial to charge with comparably high currents. In this case, the charging cable and the plug may be cooled with cooling fluid that may be pumped by the charging station through the charging cable and the plug.

Sometimes it may be that the electrical contact between the plug and the electric vehicle has a much higher resistance as in the usual case. Such a contact may be called bad contact and may be caused by dirt and/or damage to the electrical contact element that is in direct contact with the corresponding electrical contact element of the electric vehicle. There may be bad contact situations due to corrosion of the pins and/or contact elements which undergo high currents. A bad contact may result in a strong heating of the plug and other components and should be avoided.

WO2017/143295 A1, US 2009/195 237 A1 and US 2009/195 237 A1 show charging connectors and cables with liquid cooling, which comprise a temperature sensor.

DESCRIPTION OF THE INVENTION

It is an objective of the invention to provide a reliable and simple method for detecting a bad contact.

This objective is achieved by the subject-matter of the independent claims. Further exemplary embodiments are evident from the dependent claims and the following description.

An aspect of the invention relates to a method for detecting a bad contact of a charging cable.

A charging cable may be a member for temporary interconnecting a charging station with a device to be charged, which may have a plug at its end. The charging cable may comprise electrical conductors and/or wires for conducting the charging current, pipes or hoses for conducting cooling fluid and/or a cover in which these components are received.

The charging cable may be adapted for conducting current above 10 A, in particular above 100 A.

A bad contact may be an electrical contact between an electrical contact element of the charging cable and a corresponding electrical contact element of a device to be charged with the charging cable, which has a resistance higher, such as at least 10 times higher, as an optimal contact, which may have a resistance of nearly 0.

According to an embodiment of the invention, the method comprises: measuring a cooling fluid temperature of a cooling fluid flowing through the charging cable; measuring a connector base temperature of a connector base of the charging cable, which connector base carries an electrical contact element of the charging cable; estimating a contact temperature of the electrical contact element by determining the contact temperature from a difference of the connector base temperature and the cooling fluid temperature; and deciding a presence of a bad contact, when the estimated contact temperature is higher than a threshold temperature.

A plug of the charging cable may comprise one or more connectors, which may be composed of a connector base and an electrical contact element. For example, there may be at least a DC+ connector and a DC- connector. The connector base may provide an electrical connection from a conductor in the charging cable with the electrical contact element. The electrical contact is intended to be in direct contact with a contact element of the device to be charged. The electrical contact may protrude from the plug. The electrical contact element may be a pin and/or may be adapted to receive a pin. In the latter case, the electrical contact element also may be called leaf.

The cooling fluid may flow through the charging cable and may cool the connector and in particular the connector base, which then cools the electrical contact element. The cooling fluid may heat while cooling the connector. The cooling fluid temperature may be measured downstream or upstream of the plug and/or the connector. Any position upstream or downstream of a heat exchanger for cooling the cooling fluid may be suitable for measuring the cooling fluid temperature.

The cooling fluid may be a cooling oil and/or may be electrically isolating. The method may be used with a liquid cooled charging cable and/or may be applied, if the liquid inside the charging cable at least partially vaporizes, which may be the case for a two-phase cooled charging cable.

The connector base temperature may be measured anywhere on the connector base. Placing a temperature sensor at the connector base may be much simpler than directly measuring the temperature of the electrical contact element directly. It has to be noted that a direct measurement of the temperature of the electrical contact element and in particular its top part may not be possible or at least comparable complicated, since wiring for a temperature sensor has to be guided along parts of the electrical contact element.

The temperature of the contact element is then estimated from the cooling fluid temperature and the connector base temperature. This may be done by applying a predefined function to the cooling fluid temperature and the connector base temperature. The function may be chosen such that the estimated contact temperature increases, when the difference of the connector base temperature and the cooling fluid temperature increases. A difference of the connector base temperature and the cooling fluid temperature may be calculated. This difference may be 0 or higher, since the cooling fluid temperature may be equal or less the connector base temperature. From this difference then the contact temperature may be estimated, for example by applying a predefined function to the difference.

The estimated contact temperature is then compared with a temperature threshold, for deciding, whether there is a bad contact or not. When the estimated contact temperature is higher than the threshold, it is decided that a bad contact is present and, for example, charging may be stopped, or at least the charging current may be reduced to avoid overheating. The threshold temperature may be more than 80° C., for example 110° C.

It has to be noted that the estimated contact temperature may be different from the real contact temperature. However, for deciding on the presence of a bad contact it only may be necessary that the estimated contact temperature discriminates between normal operation, i.e. temperatures generated during a good contact and abnormal operation, i.e. situation with a bad contact.

Experiments have shown that estimating the contact temperature from a function, which depends on the difference of the connector base temperature and the cooling fluid temperature, produces much more reliable results than estimating the contact temperature from the connector base temperature alone. This may be due to the fact, that a bad contact and the heat generated by the bad contact may have more influence on the amount of heat transfer between the connector base and the cooling fluid as on the resulting connector base temperature.

The method as described herein provides an effective detection mechanism that reliably can detect a bad contact, and for example may stop a charge session. Furthermore, it also may not flag any contacts as being bad, when they are not.

According to an embodiment of the invention, the function may be chosen such that the contact temperature is equal to the cooling fluid temperature and/or the connector base temperature, when the connector base temperature and the cooling fluid temperature are equal.

According to an embodiment of the invention, the estimated contact temperature is determined by linearly extrapolating the difference of the connector base temperature and the cooling fluid temperature. It may be assumed that the estimated contact temperature depends linearly on the difference.

According to an embodiment of the invention, the estimated contact temperature is the cooling fluid temperature plus the difference of the connector base temperature and the cooling fluid temperature multiplied by a constant factor. The constant factor may be determined by experiment and/or may depend on the design of the connector and optionally the placement of a connector base temperature sensor. The constant factor may be higher than 1, for example between 1.5 and 5.

In general, the function may comprise a term linear in the difference of the connector base temperature and the cooling fluid temperature. The function may comprise a term linear in the connector base temperature and/or the cooling fluid temperature. Furthermore, higher order terms in the difference of the connector base temperature and the cooling fluid temperature may be added to the function, each of these terms may have a constant factor, which may be different from the constant factor of the linear term.

According to an embodiment of the invention, the connector base comprises a cavity through which cooling fluid is guided. The connector base may comprise an inlet and an outlet for cooling fluid, which may be connected to pipes or hoses conducting the cooling fluid. To the connector base, for example opposite to the inlet and the outlet, the electrical contact element may be attached. The electrical contact element may be in direct thermal and/or direct electrical contact with the connector base.

According to an embodiment of the invention, the connector base temperature is measured with a temperature sensor attached to an inside of the connector base. The temperature sensor may be arranged inside the cavity for the cooling fluid. It may be that the electrical wire connected to the temperature sensor is provided inside a pipe or hose for conducting cooling fluid. The cooling fluid may be electrically isolating.

It also may be that the temperature sensor is immersed into the material of the connector base.

The temperature sensor for measuring the connector base temperature may be arranged at a position, where the electrical contact element is attached to the connector base. Thus, the temperature sensor may sense a temperature of a foot of the electrical contact element.

According to an embodiment of the invention, the connector base temperature is measured with a temperature sensor attached to an outside of the connector base. It also is possible that the temperature sensor is connected to an outer surface of the connector base. In this case, an electrical wire connected to the temperature sensor need not be guided inside a cavity in the connector base.

According to an embodiment of the invention, the connector base is cooled with cooling fluid. As already mentioned, there may be a cavity inside the connector base into which cooling fluid is introduced. However, also other options may be possible, for example that the cooling fluid is guided through a heat exchanger attached to the connector base.

According to an embodiment of the invention, the cooling fluid temperature is measured with a temperature sensor arranged in a cooling fluid flow returning from the connector base. The temperature of the cooling fluid need not be measured near the connector but may be measured anywhere in the cooling system. The temperature sensor for the cooling fluid temperature may be arranged in a pipe and/or hose connected to an outlet of the connector base, i.e. downstream of the connector base. It also may be measure in an outlet of the connector base.

It also may be possible that the cooling fluid temperature is measured with a temperature sensor arranged in a cooling fluid flow flowing towards the connector base. The temperature sensor for the cooling fluid temperature may be arranged in a pipe and/or hose connected to an inlet of the connector base, i.e. upstream of the connector base. It also may be measure in an inlet of the connector base.

According to an embodiment of the invention, the cooling fluid is pumped from a tank through hoses between the tank and the electrical contact. There may be a heat exchanger for cooling the cooling fluid, before it enters the pipe and/or hose upstream of the connector base.

According to an embodiment of the invention, the cooling fluid temperature is measured with a temperature sensor in the tank. This temperature sensor also may be used for controlling fans for cooling a heat exchanger, which is used for cooling the cooling fluid. In such a way, no further temperature sensor may be needed.

A further aspect of the invention relates to a method for charging an electrical device. The method may be performed by a charging station and/or its controller. The charging of the electrical device, such as an electric vehicle, may be controlled in dependence, whether a bad contact was detected.

According to an embodiment of the invention, the charging method comprises: charging the electrical device via a charging cable by generating a current in the charging cable; detecting a bad contact of the charging cable with the method of one of the previous claims; and interrupting the current, when a bad contact has been detected. The charging current may be generated with an inverter of the charging station. The inverter may be controlled by the same controller, which also performs the method for detecting a bad contact. When the controller detects a bad contact, it may interrupt the charging, for example by turning off the inverter. Also a message may be generated, that, for example, may be output by the charging station, that a problem has occurred during charging.

A further aspect of the invention relates to a controller for a charging station adapted for performing the detection method and/or the charging method as described in the above and in the below. For example, the controller may comprise a processor and a memory, in which a computer program is stored, which, when executed by the processor, is adapted for performing the method. It also may be possible that the method is at least partially implemented in hardware.

A further aspect of the invention relates to a charging station, which comprises a charging cable with a plug comprising electrical contact elements; a cooling system for cooling the charging cable by generating a flow of cooling fluid through the charging cable and the plug; a first temperature sensor for measuring a cooling fluid temperature of the cooling fluid; a second temperature sensor for measuring a connector base temperature of a connector base arranged in the plug and a controller as described in the above and in the below.

In summary, the charging cable and/or the charging station may be equipped with at least two temperature sensors that are used to detect a bad contact that may result in excessive temperature increase.

It may be that the plug has several connectors with a connector base and an electrical contact element has described in the above and in the below. Every connector base may be provided with a temperature sensor for measuring a connector base temperature. It also may be that only one temperature sensor for measuring the cooling fluid temperature is provided for several connectors. The bad contact detection method may be performed for every connector base and/or for every temperature sensor for measuring a connector base temperature.

According to an embodiment of the invention, the cooling system comprises pipes and/or hoses in the charging cable for transporting the cooling fluid. The pipes and/or hoses may be connected to the connector base. There may be a pipe and/or hose for supplying cooling fluid to the connector base and a pipe and/or hose for returning cooling fluid back through the charging cable.

According to an embodiment of the invention, the cooling system comprises a pump for pumping cooling fluid through the charging cable. The pump may be provided in a base unit of the charging station, which base unit also may comprise other components, an inverter, a controller, a heat exchanger, etc.

According to an embodiment of the invention, the cooling system comprises a tank for storing cooling fluid. The tank may be interconnected in a cooling loop, which comprises a heat exchanger, two pipes and/or hoses and the connector base.

According to an embodiment of the invention, the charging station and the charging cable are adapted for charging an electric vehicle. The charging station and/or the charging cable may be a part of the charging infrastructure for electric vehicles. The charging station may be installed in a service station, for example near a road or a parking place, where a person can manually interconnect the charging cable with an electric vehicle, which then may be charged.

It has to be understood that features of the method as described in the above and in the following may be features of the controller and/or the charging station as described in the above and in the following, and vice versa.

These and other aspects of the invention will be apparent from and elucidated with reference to the embodiments described hereinafter.

BRIEF DESCRIPTION OF THE DRAWINGS

The subject-matter of the invention will be explained in more detail in the following text with reference to exemplary embodiments which are illustrated in the attached drawings.

FIG. 5 shows a diagram with temperatures over time during a second charging session.

FIG. 6 shows a diagram with temperatures over time during a third charging session.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

Figure 1:
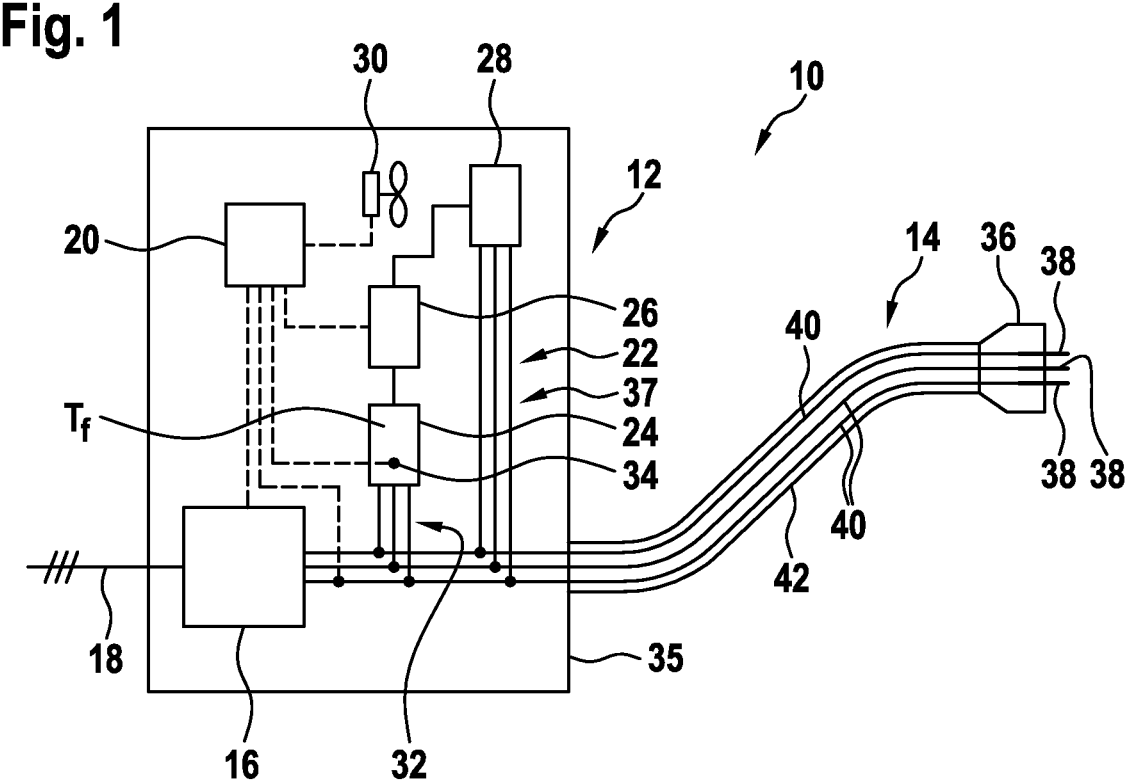
FIG. 1 schematically shows a charging station according to an embodiment of the invention.

FIG. 1 shows a charging station 10, which comprises a base unit 12 and a charging cable 14. The base unit 12 may be installed in a service station, in which electric vehicles may be charged.

The base unit 12 may comprise an inverter 16, which may be connected to an electrical grid 18 and/or which may be adapted for converting an AC current from the electrical grid into a DC current to be supplied to the charging cable 14 and via the charging cable 14 to an electric vehicle. The inverter 16 may be controlled by a controller 20, which also may measure a charging current supplied to the charging cable 14 and/or which may control the charging based on the measured current.

In the base unit 12, also components of a cooling loop or cooling system 22 may be accommodated. The cooling loop 22 comprises a tank 24, pump 26 and a heat exchanger 28 with optionally a fan 30.

The tank 24 may be connected with pipes 32 returning from the charging cable and/or may be used for storing cooling fluid, which may be a liquid, such as cooling oil. In the tank 24, a temperature sensor 34 may be arranged that is adapted for measuring a temperature $T_f$ of the cooling fluid. The sensor signal from the sensor 34 may be received and evaluated by the controller 20.

The pump 26 and its speed may be controlled by the controller 20, which may control the speed of the pump 26 based on the measured cooling fluid temperature. When active, the pump 26 pumps cooling fluid through the cooling loop 22 and in particular from the tank 24 to the heat exchanger 28 and from there towards the charging cable 14. When having passed through the charging cable 14 and being heated inside the charging cable 14, the cooling fluid returns into the tank 24.

The fan 30 is used for cooling the heat exchanger 28 and the cooling liquid passing through it. Also the fan 30 and its speed may be controlled by the controller 20, for example based on the measured cooling fluid temperature.

The heat exchanger 28 may be connected with pipes 37 conducting the cooling fluid to the charging cable 14.

It is possible that the components of the cooling loop 22 are arranged in another order. For example, the pump 26 may pump the cooling fluid into the charging cable 14, than the cooling fluid may come back to the base unit 12, may passes through the heat exchanger 28 and the tank 24 before coming back to the pump 26.

The base unit 12 may have a housing 35, in which the components 16, 20, 24, 26, 28, 30, 32, 34 are accommodated.

The charging cable 14 may comprise a flexible cable and a plug 36, which may be connected by a person to the electric vehicle to be charged.

The plug 36 comprises several connectors 38, such as three or four connectors 38, each of which is provided for connecting one phase of the charging current and/or for protective reasons with a corresponding electrical contact of the electric vehicle.

For each connector 38, the charging cable 14 may have a line 40, which comprises two hoses or pipes and one or more electrical conductors for conducting a charging current and optionally measurement signals. The lines 40 of the charging cable may be accommodated in a flexible common cover 42, such as a plastics hose.

Figure 2:
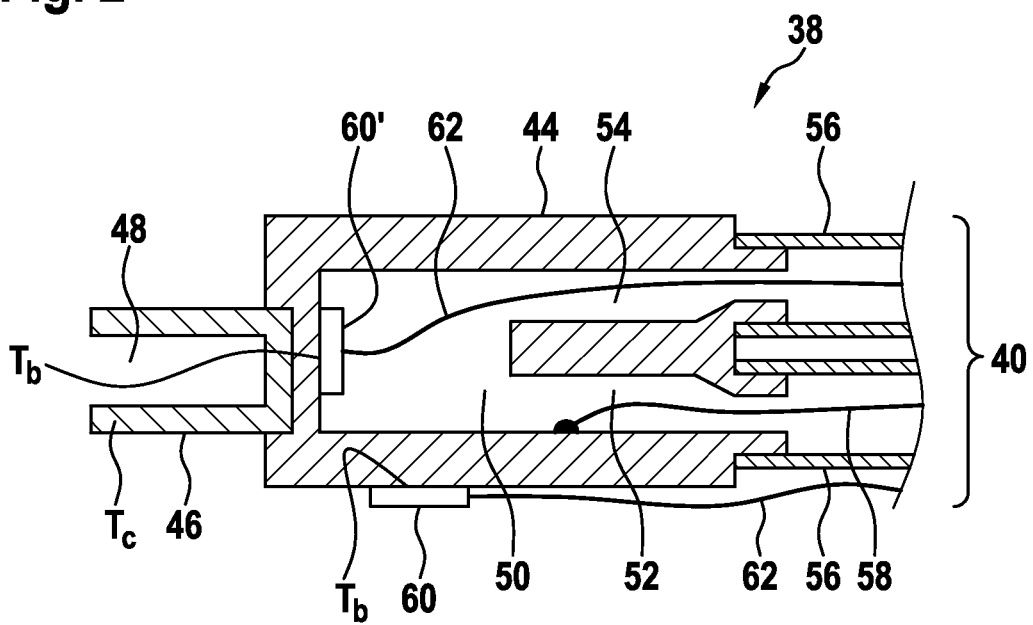
FIG. 2 schematically shows a connector at an end of a charging cable for a charging station according to an embodiment of the invention.

A connector 38 is shown in FIG. 2 in more detail. The connector 38 comprises a connector base 44, which may be housed in the plug 36 and a contact element 46, which may protrude from the plug 36. The contact element 46 may comprise an opening 48, in which a pin of the electric vehicle may be plugged. It also is possible that the contact element 46 is formed like a pin. The contact element 46 is directly attached to the base 44. Both the contact element and the base 44 may be made of metal, such as copper.

The connector base 44 comprises a cavity 50 for cooling fluid and an inlet 52 and an outlet 54 to the cavity. Both the inlet 52 and the outlet 54 are connected to a hose or pipe 56. One of the hoses 26 is may be connected to the tank 24 or the pump 26. The other one of the hoses may be connected to the heat exchanger 28. The hoses 56 and the cavity 50 may be seen as further parts of the cooling loop 22.

Through one of the hoses 56 a wire and/or conductor 58 is guided, which connects the connector base 44 to the inverter 16. In such a way, current may be conducted from the inverter 16 through the respective hose 56 to the connector base 44 and therefrom to the electrical contact 46.

The connector 38 furthermore comprises a temperature sensor 60, 60', which measures a connector base temperature $T_b$. One possibility is that the temperature sensor 60 is attached to an outside of the connector base 44. In this case, the signal wire 62 connecting the sensor 60 to the controller 20 may run outside of the base 44 and through the charging cable 14 to the base unit 12 of the charging station 10.

Another possibility is that the temperature sensor 60' is attached to an inside of the base 44, i.e. to the inside of the cavity 50. In this case, the signal wire 62 connecting the sensor 60 to the controller 20 may run through the cavity and/or through one of the hoses 56 through the charging cable 14 to the base unit 12 of the charging station 10. It may be that the signal wire runs to one of the hoses 56 and that the charging wire 58 runs through the other hose 56.

During a normal operation, the resistance between the electric contact element 46 and a corresponding electric contact element of the electric vehicle (such as a pin) is very small. However, when there is dirt on the electrical contact elements, corrosion or a mechanical misalignment, the resistance may become much higher. This may be called a bad contact between the two contact elements. In the case of a bad contact, the electrical contact elements start to heat up more than during normal operation. Although the contact element 46 is cooled, the temperature of the mechanical connected components may rise to values, where damage may take place. This is prevented with the method as described above and below, which estimates a contact temperature $T_c$ of the contact element 46.

Figure 3:
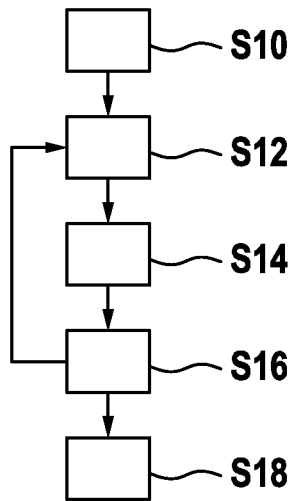
FIG. 3 shows a flow diagram with a method detecting a bad contact of a charging cable and for charging an electrical device according to an embodiment of the invention.

FIG. 3 shows a method that may be performed by the controller 20 and that may prevent an overheating of the contact element 46.

In step S10, the plug 36 is plugged into an electrical device, such as an electric vehicle, which is detected by the controller 20 and the controller 20 starts to charge the electrical device via a charging cable 14 by generating a current in the charging cable 14.

In the following steps S12 to S16, the controller 20 detects whether there is a bad contact of the charging cable 14 or not.

In step S12, a cooling fluid temperature $T_f$ of a cooling fluid flowing through the charging cable 14 is measured with a temperature sensor 34. The cooling fluid temperature $T_f$ may be measured with a temperature sensor 34 arranged in the tank 24.

Furthermore, in step S12, a connector base temperature $T_b$ of the connector base 44 of the charging cable14 is measured with a further temperature sensor 60, 60'. The connector base temperature $T_b$ may be measured with a temperature sensor 60' attached to an inside of the connector base 44 or with a temperature sensor 60 attached to an outside of the connector base 44.

In step S14, a contact temperature $T_c$ of the electrical contact element 46 is estimated from the connector base temperature $T_b$ and the cooling fluid temperature $T_f$. Both measurement signals from the sensors 34, 60, 60' are received in the controller 20 and are processed there.

The contact temperature $T_c$ may be determined with the following formula:

$$T_c = T_f + c \cdot (T_b - T_f)$$

A difference of the connector base temperature $T_b$ and the cooling fluid temperature $T_f$ is determined, this difference is multiplied with a constant factor c and the cooling fluid temperature $T_f$ is added to the result. Also higher order terms in the difference $T_b - T_f$ may be present.

The estimated contact temperature $T_c$ may be determined from a function that depends on the difference of the connector base temperature $T_b$ and the cooling fluid temperature $T_f$.

In step S16, the controller 20 decides, whether there is a bad contact present or not. The controller 20 compares the contact temperature $T_c$ with a threshold temperature $T_t$. When the contact temperature $T_c$ is higher than the threshold temperature $T_t$, it is assumed that there is a bad contact.

In step S18, when a bad contact is detected, the controller 20 interrupts the charging current. Otherwise, charging is continued.

Figure 4:
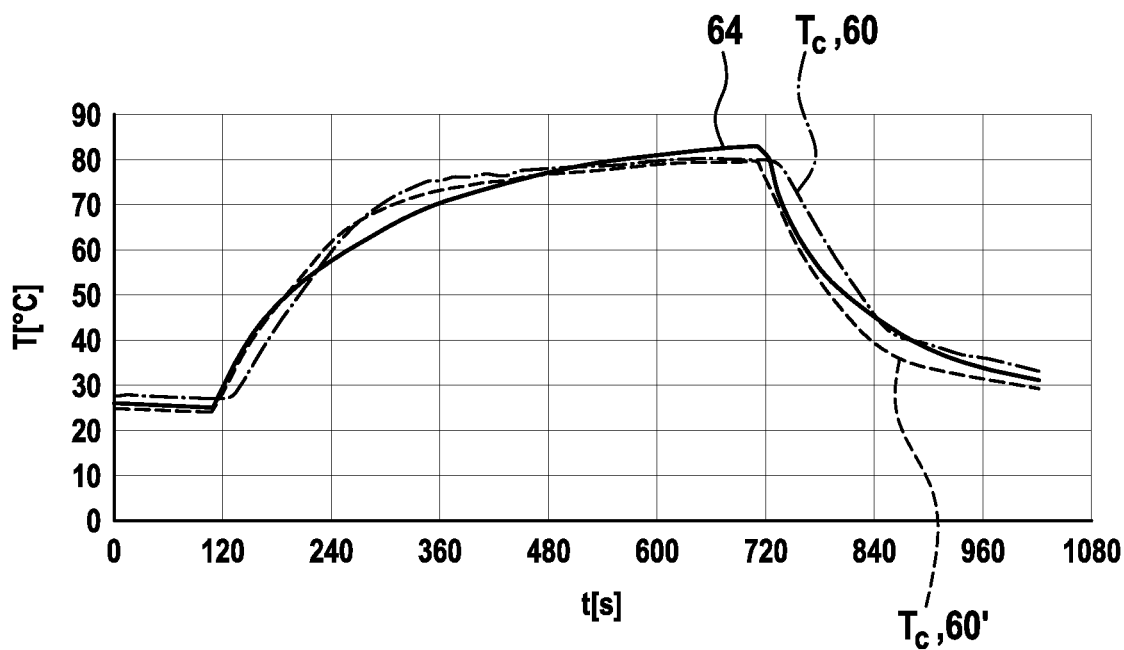
FIG. 4 shows a diagram with temperatures over time during a first charging session.

FIG. 4 to FIG. 6 show diagrams with measured and estimated contact temperatures that were measured and estimated during different charging sessions. All diagrams show the time t on the x-axis and the temperature T on the y-axis.

All charging sessions start with 2 minutes just pumping the cooling fluid around, continue with up to 10 minutes of charging at constant current of 450 A, and after that end with 5 minutes cooling down. All charging sessions were performed at 20° C. ambient temperature.

FIG. 4 shows a calibration charging session, that was used to determine constant factor c for a specific design of the connector 38. In the charging session of FIG. 4, the pin, which was plugged into the contact element 46, was a steel pin, which has a higher resistance than a usual used copper pin.

With the measurements of the charging session of FIG. 3, the constant factor was determined to be c=3.9 for the temperature sensor 60 at the outside and c=2.4 for the temperature sensor 60' at the inside.

The curve 64 shows the measured contact temperature, the curve $T_c$, 60 the estimated contact temperature determined from the measurements of the sensor 60 and the curve $T_c$, 60' the estimated contact temperature determined from the signal of the sensor 60'. It can be seen that the curves are nearly equal.

It may be beneficial to determine the constant factor c with a steel pin or contact with higher resistance as during a normal, good contact, since then, as will be shown below, the resulting formula may overpredict the estimated contact temperature, which will ensure that no calamities are missed. It will however be accurate enough so that it may prevent from having false positives. During normal operation, the method may overpredict the temperature of the contact element, but this predicted value may be far below the threshold limit, thus it is unlikely to have false positives.

FIG. 5 shows a charging session with a good contact. As can be seen, the estimated contact temperatures $T_c$ based on the measurements from the sensor 60 or the sensor 60' and the corresponding constant factor c as determined in the charging session shown in FIG. 4, are higher than the directly measured contact temperature 64. The method seems to overpredict, but not by more than about 10° C., and only when there is no problem to be detected. It also can be seen that the speed of detection also does not suffer due to the fact that the sensor 60 is further away from the contact element as the sensor 60'.

FIG. 6 shows a charging session with a bad contact. The estimated contact temperatures $T_c$ based on the measurements from the sensor 60 or the sensor 60' raise a bit higher as the directly measured contact temperature 64. When the threshold temperature $T_t$ is reached, the charging is stopped and the contact element 46 cools down due to the continuing cooling liquid flow.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS 10 charging station
12 base unit
14 charging cable
16 inverter
18 electrical grid
20 controller
22 cooling loop/cooling system
24 tank
26 pump
28 heat exchanger
30 fan
32 pipes
34 temperature sensor
35 housing
36 plug
37 pipes
38 connector
40 line
42 cover
44 connector base
46 electrical contact element
48 opening
50 cavity
52 inlet
54 outlet
56 hose
58 charging wire
60 temperature sensor
60' temperature sensor
62 signal wire
64 measure contact temperature
$T_f$ cooling fluid temperature
$T_b$ connector base temperature
$T_c$ contact temperature
$T_t$ threshold temperature

The invention claimed is:

1. A method for detecting a bad contact of a charging cable, the method comprising:
   measuring a cooling fluid temperature of a cooling fluid flowing through the charging cable;
   measuring a connector base temperature of a connector base of the charging cable, which connector base carries an electrical contact element of the charging cable;
   estimating a contact temperature of the electrical contact element from the connector base temperature and the cooling fluid temperature, wherein the estimated contact temperature increases, when the difference of the connector base temperature and the cooling fluid temperature increases; and
   deciding presence of a bad contact, when the estimated contact temperature is higher than a threshold temperature.

2. The method of claim 1, wherein the estimated contact temperature is equal to the cooling fluid temperature, when the connector base temperature and the cooling fluid temperature are equal.

3. The method of claim 2, wherein the estimated contact temperature is the cooling fluid temperature plus the difference of the connector base temperature and the cooling fluid temperature multiplied by a constant factor.

4. The method of claim 2, wherein the connector base comprises a cavity through which cooling fluid is guided.

5. The method of claim 2, wherein the connector base temperature is measured with a temperature sensor attached to an inside of the connector base.

6. The method of claim 2, wherein the connector base temperature is measured with a temperature sensor attached to an outside of the connector base.

7. The method of claim 1, wherein the estimated contact temperature is the cooling fluid temperature plus the difference of the connector base temperature and the cooling fluid temperature multiplied by a constant factor.

8. The method of claim 1, wherein the connector base comprises a cavity through which cooling fluid is guided.

9. The method of claim 1, wherein the connector base temperature is measured with a temperature sensor attached to an inside of the connector base.

10. The method of claim 1, wherein the connector base temperature is measured with a temperature sensor attached to an outside of the connector base.

11. The method of claim 1, wherein the connector base is cooled with cooling fluid;
wherein the cooling fluid temperature is measured with a temperature sensor arranged in a cooling fluid flow returning from the connector base; or
wherein the cooling fluid temperature is measured with a temperature sensor arranged in a cooling fluid flow flowing towards the connector base.

12. The method of claim 1, wherein the cooling fluid is pumped from a tank through a hose in the charging cable between the tank and the electrical contact.

13. The method of claim 12, wherein the cooling fluid temperature is measured with a temperature sensor in the tank.

14. The method of claim 1, wherein the cooling fluid is a cooling oil.

15. A method for charging an electrical device, the method comprising:
charging the electrical device via a charging cable by generating a current in the charging cable;
detecting a bad contact of the charging cable with at least the following steps:
measuring a cooling fluid temperature of a cooling fluid flowing through the charging cable;
measuring a connector base temperature of a connector base of the charging cable, which connector base carries an electrical contact element of the charging cable;
estimating a contact temperature of the electrical contact element from the connector base temperature and the cooling fluid temperature, wherein the estimated contact temperature increases, when the difference of the connector base temperature and the cooling fluid temperature increases;
deciding presence of a bad contact, when the estimated contact temperature is higher than a threshold temperature; and
interrupting the current, when a bad contact has been detected.

16. A controller for a charging station comprising:
a memory structured to store a set of instructions; and
a processor structured to execute the set of instructions stored by the memory effective to:
receive a cooling fluid temperature of a cooling fluid flowing through the charging cable,
receive a connector base temperature of a connector base of the charging cable, which connector base carries an electrical contact element of the charging cable,
estimate a contact temperature of the electrical contact element from the connector base temperature and the cooling fluid temperature, wherein the estimated contact temperature increases, when the difference of the connector base temperature and the cooling fluid temperature increases, and
decide presence of a bad contact, when the estimated contact temperature is higher than a threshold temperature.

17. A charging station comprising:
a charging cable with a plug comprising electrical contact elements;
a cooling system for cooling the charging cable by generating a flow of cooling fluid through the charging cable and the plug;
a first temperature sensor for measuring a cooling fluid temperature of the cooling fluid;
a second temperature sensor for measuring a connector base temperature of a connector base arranged in the plug; and
a controller comprising:
a memory structured to store a set of instructions; and
a processor structured to execute the set of instructions stored by the memory effective to:
receive the cooling fluid temperature of the cooling fluid flowing through the charging cable,
receive the connector base temperature of the connector base of the charging cable, which connector base carries an electrical contact element of the charging cable,
estimate a contact temperature of the electrical contact element from the connector base temperature and the cooling fluid temperature, wherein the estimated contact temperature increases, when the difference of the connector base temperature and the cooling fluid temperature increases, and
decide presence of a bad contact, when the estimated contact temperature is higher than a threshold temperature.

18. The charging station of claim 17,
wherein the cooling system comprises pipes in the charging cable for transporting the cooling fluid;
wherein the cooling system comprises a pump for pumping cooling fluid through the charging cable;
wherein the cooling system comprises a tank for storing cooling fluid.

19. The charging station of claim 18, wherein the charging station and the charging cable are adapted for charging an electric vehicle.

20. The charging station of claim 17, wherein the charging station and the charging cable are adapted for charging an electric vehicle.

* * * * *